(12) United States Patent
Shisgal

(10) Patent No.: US 8,899,483 B2
(45) Date of Patent: Dec. 2, 2014

(54) MAGNETIC POS ENGAGEMENT SYSTEM FOR MOBILE DEVICES

(71) Applicant: Barry Shisgal, Miami Beach, FL (US)

(72) Inventor: Barry Shisgal, Miami Beach, FL (US)

(*) Notice: Subject to any disclaimer, the term of this patent is extended or adjusted under 35 U.S.C. 154(b) by 0 days.

(21) Appl. No.: 14/156,485

(22) Filed: Jan. 16, 2014

(65) Prior Publication Data

US 2014/0197235 A1 Jul. 17, 2014

Related U.S. Application Data

(60) Provisional application No. 61/753,669, filed on Jan. 17, 2013.

(51) Int. Cl.
*G06K 7/08* (2006.01)
*G06Q 20/20* (2012.01)
*G06Q 20/32* (2012.01)
*G06Q 20/34* (2012.01)

(52) U.S. Cl.
CPC .............. *G06Q 20/204* (2013.01); *G06K 7/088* (2013.01); *G06Q 20/322* (2013.01); *G06Q 20/3229* (2013.01); *G06Q 20/354* (2013.01)
USPC ......................................... 235/449; 235/450

(58) Field of Classification Search
CPC ............................................... G06K 7/08–7/10
USPC ......................................... 235/449–450, 435
See application file for complete search history.

(56) References Cited

U.S. PATENT DOCUMENTS

2004/0192220 A1* 9/2004 Huang et al. .................... 455/74
2005/0128062 A1* 6/2005 Lundsgaard et al. ......... 340/436
2013/0027186 A1* 1/2013 Cinbis et al. ................. 340/10.1

* cited by examiner

*Primary Examiner* — Christle I Marshall

(57) ABSTRACT

A system, method and apparatus designed to activate and trigger a mobile commerce related application, interface and or menu of option and or to affect a process related to mobile commerce by using an activation device located at the Point of Sale (POS) which contains a magnetic or electromagnetic activator and a mobile device with one or more magnetic reed switches, reed relay switches or a Resonant Inductive Coupling Sensor (electrodynamic induction receiver coils).

1 Claim, 1 Drawing Sheet

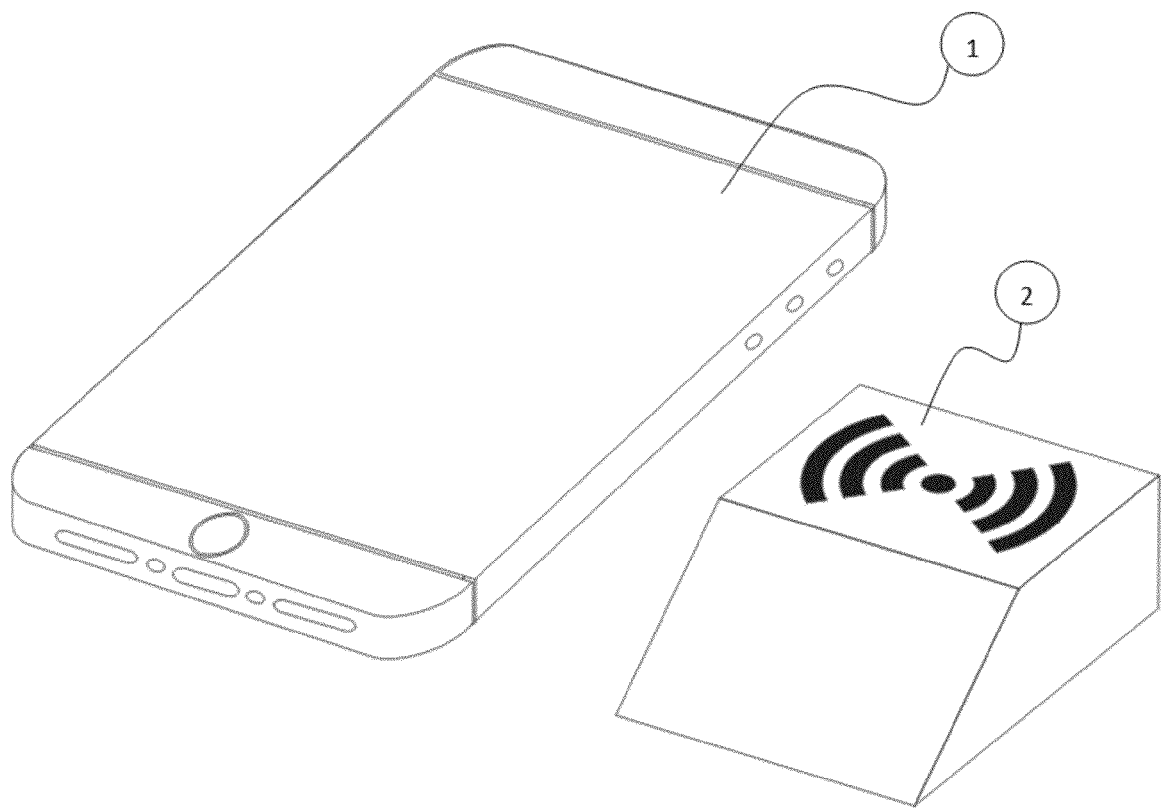

MAGNETIC POS ENGAGEMENT SYSTEM FOR MOBILE DEVICES

This application is a continuation of provisional patent application No. 61/753,669, filed Jan. 17, 2013.

BACKGROUND OF THE INVENTION

1. Field of the Invention

The present invention relates to a system, method and apparatus designed to trigger a mobile commerce related application, interface and or menu of option and or to affect a process related to mobile commerce.

Relevant classifications include: U.S. Patent Class: 335/207, 324/228, 335/153

2. Description of Related Art

Presently, there are three practical methods for activating the RFID/NFC and/or 1D/2D Code Scanner/Display features of a Mobile Device in preparation for a POS Payment/Loyalty electronic handshake and/or a user-login handshake. One method is to leave the Mobile Device's NFC transceiver always-on so that the user can scan NFC tags. The disadvantage of this method would affect a drain on the device's battery. A second method is to require users to manually activate the Mobile Device's scanner, transceiver or specific mobile-commerce app. The disadvantage of this method is that it is time consuming and could cause user frustration. A third method is proximity-based activation in which the mobile device automatically launches a mobile commerce application when the user is within a certain geographic area. This method uses GPS or Bluetooth radios and has several shortcomings. One, is that the GPS/Bluetooth receiver and the process of constant location analysis drains the device's battery. Two, is that the user may not desire to use the application, and when it is automatically launched it inconveniences the user. Three, that GPS trigger are often imprecise and often trigger the application after the user had already completed the transaction.

BRIEF SUMMARY OF THE INVENTION

The object of the present invention is to provide a mobile device activation system in which one or more magnetic reed switches, reed relay switches or a Resonant Inductive Coupling Sensor (electrodynamic induction receiver coils) are embedded within a mobile device and are triggered by mating or coupling said device with a fixed magnetic field, a pulsating electromagnetic field or an electrodynamic inductor generated by a Point of Sale (POS) activation device.

The advantages of the object of this invention are that the user does not have to manually activate the mobile device nor does the mobile device need to actively scan for radio signals such as GPS, Bluetooth or NFC signals. Instead, this invention allows a user to place the inactive mobile device in the proximity of the POS activation device, and the magnetic fields trigger the mobile device to activate and launch the appropriate application and or handshake mechanism, be it an NFC transmission, a 1D/2D display or scan or any other form of transmitting a handshake or token to or from the POS terminal.

BRIEF DESCRIPTION OF THE SEVERAL VIEWS OF THE DRAWING

FIG. 1 depicts an embodiment of the object of this invention wherein a mobile device (1), equipped with one or more magnetic reed switches, reed relay switches or a Resonant Inductive Coupling Sensor (electrodynamic induction receiver coils), is positioned by its user in proximity to a POS activation device located at the Point of Sale (POS) (2), which is equipped with a permanent magnet, an electromagnet or an electrodynamic inductor coil. Once positioned in the proximity of the POS activation device, the magnetic fields activate the mobile device, launch the appropriate application and initiate the appropriate handshake or token-exchange mechanism (NFC, Barcode, alphanumeric, etc.).

DETAILED DESCRIPTION OF THE INVENTION

The object of this invention is to provide a mobile device activation system in which one or more magnetic reed switches, reed relay switches or a Resonant Inductive Coupling Sensor (electrodynamic induction receiver coils) are embedded within a mobile device and are triggered or switched by mating or coupling said device with a permanent magnetic field, a pulsating electromagnetic field or an electrodynamic inductor generated by a Point of Sale (POS) activation device which trigger the magnetic switch/es or sensor/s embedded within the mobile device to cause switching or modulation of an electronic circuit within the mobile device signaling the mobile device's operating system or software to, in preparation for use in a POS transaction, launch a corresponding user interface and/or a token-handshake-interface, an NFC transceiver, an on-screen token display, a camera or a microphone application for scanning a token presented by the merchant or for presenting a token to the merchant.

One embodiment of this invention would use a permanent magnet as the Point of Sale (POS) activation device. Using a permanent magnet as the Point of Sale (POS) activation device would effectuate a binary switching mechanism which would trigger the magnetic switch within the mobile device to switch on or off signaling the mobile device's operating system or software to, in preparation for use in a POS transaction, launch a corresponding user interface and/or a token-handshake-interface, an NFC transceiver, an on-screen token display, a camera or a microphone application for scanning a token presented by the merchant or for presenting a token to the merchant.

Another embodiment of this invention would use an electromagnet as the Point of Sale (POS) activation device. Using an electromagnet as the Point of Sale (POS) activation device provides for a switching mechanism which would trigger the magnetic switch within the mobile device to switch on and/or would electromagnetically induce a modulation pattern within the mobile device's magnetic reed switches, reed relay switches or a Resonant Inductive Coupling Sensor (electrodynamic induction receiver coils), signaling the mobile device's operating system or software to, in preparation for use in a POS transaction, launch a corresponding user interface and/or a token-handshake-interface, an NFC transceiver, an on-screen token display, a camera scan or a microphone scan for acquiring a token presented by the merchant or for presenting a token to the merchant.

The Point of Sale (POS) activation device can be a standalone device or it can be a component of another Point of Sale (POS) device such as a credit card terminal or a cash register.

The object of this invention is comprised of the following sub-systems: 1.) a mobile device such as a mobile phone; 2.) one or more magnetic reed switches, reed relay switches or a Resonant Inductive Coupling Sensor (electrodynamic induction receiver coils) within said mobile device or electrically connected to such mobile device; 3.) a Point of Sale (POS) activation device; 4.) a permanent magnet or an electromagnet within said Point of Sale (POS) activation device; and 5.) an Operating System and/or a software application algorithm, operating within the mobile device, which launches the appropriate handshake interface when the magnetic switch/es or sensor/s are activated by the magnetic field generated by the POS activation device.

A person using this invention will couple an appropriately equipped mobile device in proximity to the POS activation device. The magnetic POS activation device will then cause the mobile device to activate, to display a designated user interface for the intended POS mobile commerce transaction, and or to engage a POS token-handshake-interface process.

The invention claimed is:

1. A mobile device activation system for Point of Sale (POS) transactions comprised of
   a.) a Mobile Device with computer processing capabilities and user-input capabilities, selected from the group consisting of a smartphone, a handheld or worn touchscreen device (a smart watch or a tablet) and a mobile Electronic Fob device;
   b.) one or more magnetic reed switches, reed relay switches or a Resonant Inductive Coupling Sensors (electrodynamic induction receiver coils) embedded within said mobile device or externally connected thereto,
   c.) a Point of Sale (POS) Activation Device containing a permanent magnet and/or an electromagnet which generates a magnetic field and, when coupled with said mobile device, triggers the one or more magnetic switches or sensors embedded within the mobile device to cause switching or electromagnetically induced modulation of an electronic circuit within the mobile device signaling the mobile device's operating system or software to, in preparation for use in a POS transaction, launch at least one of: a desired user interface, a token-handshake-interface, an NFC transceiver, an on-screen token display, a camera scan or a microphone scan for acquiring a token presented by the merchant or for presenting a token to the merchant.

* * * * *